(12) United States Patent
Bonnat

(10) Patent No.: US 9,557,809 B2
(45) Date of Patent: Jan. 31, 2017

(54) METHOD OF CONTROLLING AN ELECTRONIC OR COMPUTER SYSTEM

(76) Inventor: Pierre Bonnat, Las Vegas, NV (US)

( * ) Notice: Subject to any disclaimer, the term of this patent is extended or adjusted under 35 U.S.C. 154(b) by 1472 days.

(21) Appl. No.: 10/530,946

(22) PCT Filed: Oct. 9, 2003

(86) PCT No.: PCT/US03/32203
§ 371 (c)(1),
(2), (4) Date: Jan. 20, 2006

(87) PCT Pub. No.: WO2004/034159
PCT Pub. Date: Apr. 22, 2004

(65) Prior Publication Data
US 2006/0142957 A1 Jun. 29, 2006

Related U.S. Application Data

(60) Provisional application No. 60/417,539, filed on Oct. 9, 2002.

(51) Int. Cl.
| | | |
|---|---|---|
| *G09G 5/00* | (2006.01) | |
| *G06F 3/01* | (2006.01) | |
| *G06F 3/00* | (2006.01) | |
| G06F 3/033 | (2013.01) | |
| G06F 3/0362 | (2013.01) | |
| G06F 3/0354 | (2013.01) | |
| G01F 23/00 | (2006.01) | |

(52) U.S. Cl.
CPC ............... G06F 3/011 (2013.01); G06F 3/002 (2013.01); G01F 23/00 (2013.01); G06F 3/033 (2013.01); G06F 3/0354 (2013.01); G06F 3/0362 (2013.01)

(58) Field of Classification Search
CPC .......... G06F 3/002; G06F 3/011; G06F 3/033; G06F 3/0354; G06F 3/0362; G01F 23/00
USPC .. 345/163, 156–158, 184; 200/81 R; 702/50; 715/865
See application file for complete search history.

(56) References Cited

U.S. PATENT DOCUMENTS

| | | | |
|---|---|---|---|
| 4,521,772 A | 6/1985 | Lyon | |
| 4,746,913 A * | 5/1988 | Volta | .............................. 345/184 |
| 5,365,026 A * | 11/1994 | Cromer et al. | ............... 200/1 R |
| 5,740,801 A | 4/1998 | Branson et al. | |
| 5,835,077 A | 11/1998 | Dao et al. | |
| 5,889,511 A | 3/1999 | Ong et al. | |
| 6,040,821 A | 3/2000 | Franz et al. | |
| 6,323,846 B1 | 11/2001 | Westerman et al. | |
| 6,421,617 B2 * | 7/2002 | Felsenstein et al. | ............ 702/50 |
| 6,574,571 B1 | 6/2003 | Bonnat | |
| 6,801,231 B1 * | 10/2004 | Beltz | .............................. 715/865 |

OTHER PUBLICATIONS

Search Report, "International Searching Authority", PCT/US03/32203, (Aug. 24, 2005), 6 pgs.
PCT International Preliminary Examination Report for PCT Appln No. US03/032203, mailed Mar. 29, 2006 (7 pages).

* cited by examiner

*Primary Examiner* — Jimmy H Nguyen
(74) *Attorney, Agent, or Firm* — McAndrews, Held & Malloy, Ltd.

(57) ABSTRACT

A method of controlling an electronic or computer system includes receiving a plurality of input values from a plurality of fluid current sensors and using the plurality of input values and gradients between the plurality of input values to control an action of the electronic or computer system.

18 Claims, 8 Drawing Sheets

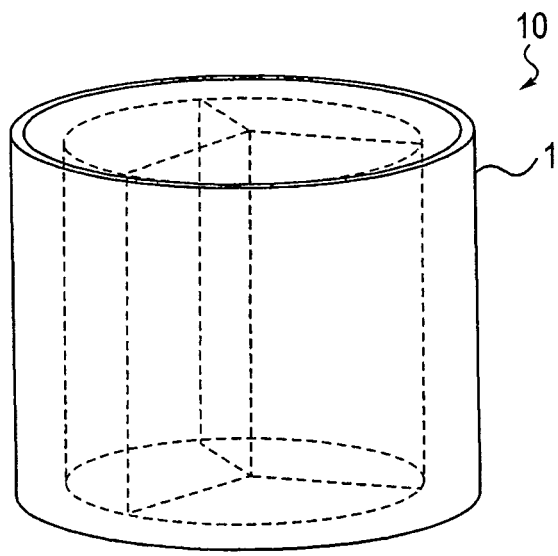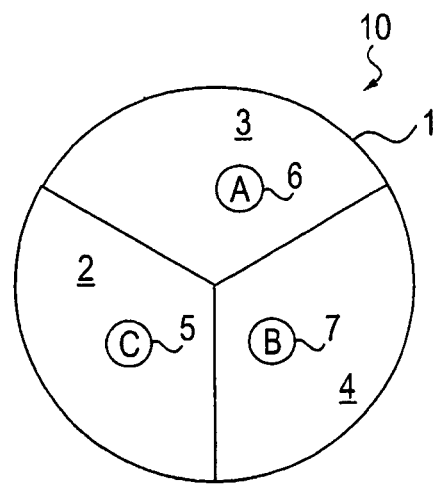
FIG 1  FIG 2
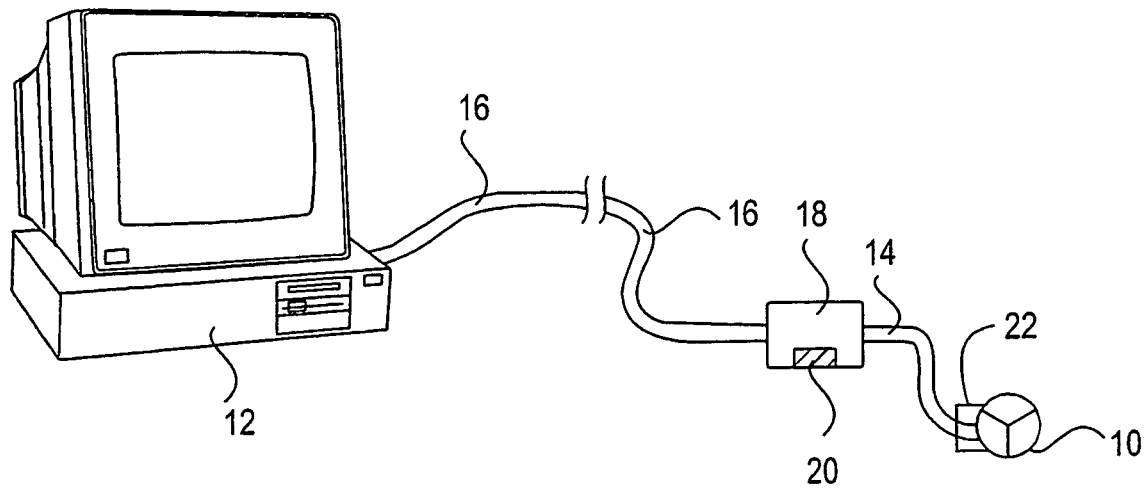
FIG 3

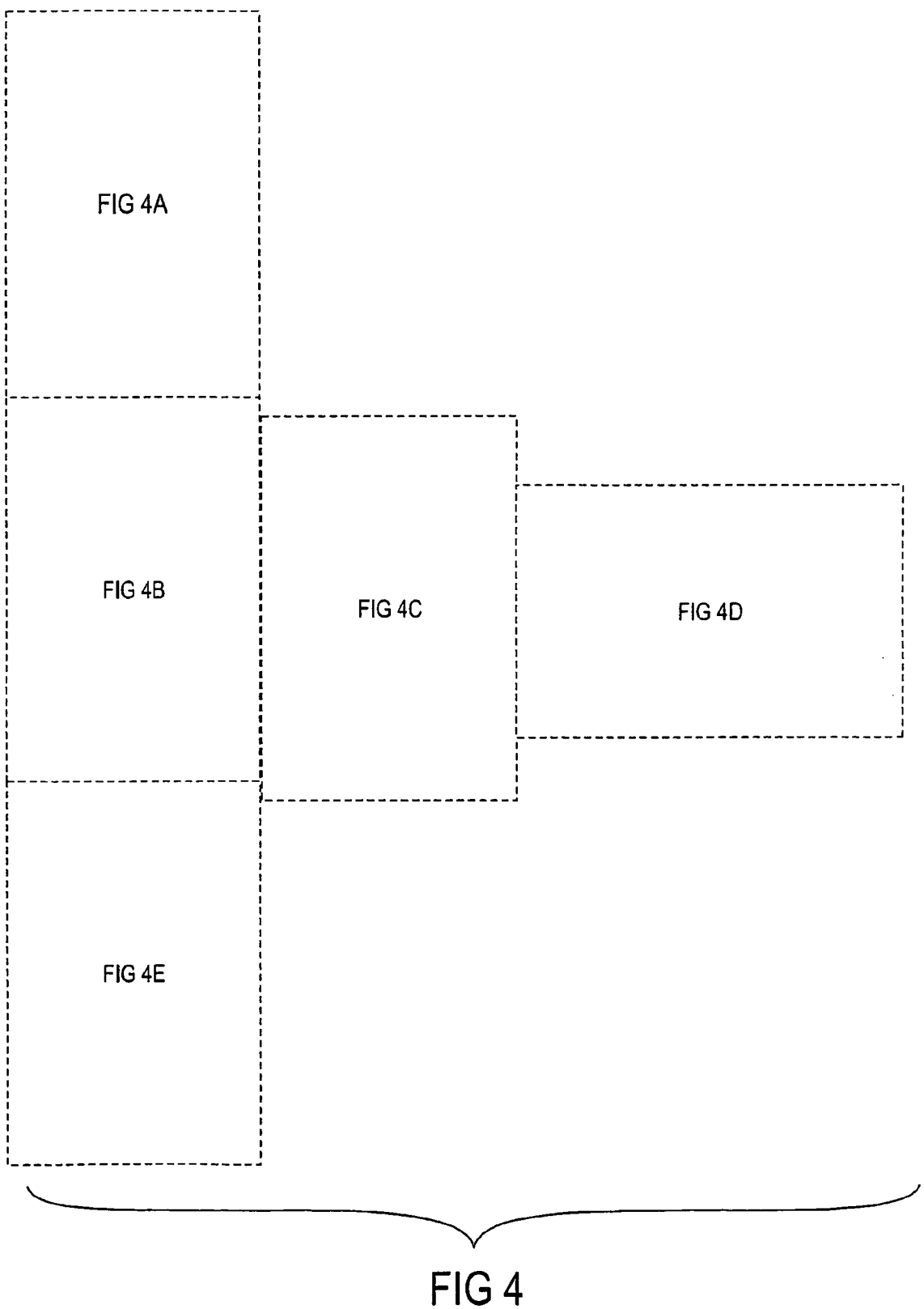

METHOD OF CONTROLLING AN ELECTRONIC OR COMPUTER SYSTEM

CROSS-REFERENCES TO RELATED APPLICATIONS

The present patent application is a national phase application of International Application No. PCT/US03/032203 filed Oct. 9, 2003, which claims priority from U.S. Provisional Application No. 60/417,539 filed Oct. 9, 2002.

The present invention claims the benefit of the filing date of U.S. provisional application Ser. No. 60/417,539, entitled Method and Apparatus to Interact with a Machine Utilizing a Fluid, filed Oct. 9, 2002.

Furthermore, the present application incorporates by reference the disclosures in the following issued patent and co-pending patent applications:

1. U.S. Pat. No. 6,574,571, entitled "METHOD AND DEVICE FOR MONITORING AN ELECTRONIC OR COMPUTER SYSTEM BY MEANS OF A FLUID FLOW", filed Aug. 10, 2001.
2. U.S. provisional application Ser. No. 60/368,602, entitled "A METHOD AND APPARATUS FOR POINTING AND CLICKING FUNCTIONS FOR CURSOR TRACKING IN GUI ENVIRONMENT", filed Mar. 29, 2002.
3. U.S. provisional application Ser. No. 60/378,561, entitled "METHOD AND DEVICE FOR PROVIDING INPUT INTERFACE FOR THE AVIONICS AND AEROSPACE APPLICATION", filed May 6, 2002.
1. U.S. provisional application Ser. No. 60/378,573, entitled "METHOD AND APPARATUS FOR MONITORING AN ELECTRONIC OR COMPUTER SYSTEM BY MEANS OF A FLUID FLOW UTILIZING OPTO-ELECTRONIC CONVERSION DEVICES", filed May 6, 2002.
5. U.S. provisional application Ser. No. 60/402,994, entitled "METHOD AND APPARATUS FOR IMPLEMENTING USER INTERFACE CONTROL, AND NATURAL LIGHT SOURCE USAGE FOR SUCH CONTROL", filed Aug. 12, 2002.

BACKGROUND OF THE INVENTION

A device known as a mouse is well known as a device used for transforming movements into controls required by a user. The mouse is typically formed by a box equipped with electronic means connected to the computer for transforming the movements of the box on the working surface into a movement of the cursor or pointer on the computer screen.

Thus, a mouse more generally includes a ball for rolling over the working surface, sensors to detect the movements of the ball and means for processing the electric signals of the sensors. More recently, infrared mice have emerged that replace the ball and sensor arrangement with an infrared movement detector. The processing means are connected to the computer by an electric cable or a Hertzien or infrared link. The processing means have been designed to deliver signals recognized by the protocol of the port to which the mouse is connected, usually corresponding to the standard RS 232. However, the mouse can also be connected to the computer via a dedicated interface card or to a specific bus in which case the processing means shall deliver one or several signals recognized by the protocol associated with this interface card or bus.

The mouse may in addition include a certain number of push or scrolling buttons which are also connected to the processing means and which correspond to validation or data entry function according to the operating mode of the computer.

The means for processing the signals derived from the movement sensors and the position sensors of the scrolling or input buttons then provide several principal functions, namely:

detection of the movement of the mouse, detection of the position of the push buttons, and communication with the computer as per the retained standard.

Communication with the microcomputer is more usually managed by a microprocessor ensuring the two parts of the processing of the signals derived from the movement and position detectors of the push-buttons. The mouse also contains means to control the electric feeding of the means for processing the signals and possibly that of the movement detection and position sensors.

Finally, the mouse is associated with control software loaded into the computer, which decodes the signal transmitted by the mouse. The driver provides the application software requesting it information concerning the state and status of the mouse: firstly the movement and secondly the position of the push-buttons so as to enable them to carry out the resultant actions.

In its most frequently used operating mode, the driver communicates with the sub-programme or movement routine of the cursor or pointer when the mouse is moved and sends messages to the programme when the push buttons of the mouse are pressed.

It ought to be said that for most of the drivers used, the movement of the pointer on the screen does not correspond directly to that of the mouse. In fact, it has been observed that the movement of the mouse can be broken down into two main movements, namely movement of the mouse until the pointer is brought into the desired zone and then its precise positioning on the targeted point or object. Thus, when the mouse is moved slowly, the driver generates a movement of the pointer on the screen of about 100 CPI (Counts Per Inch) or DPI (Dots Per Inch), and when the mouse is moved quickly, the driver generates a movement of the pointer of about 400 CPI, indeed 1000 CPI.

According to the prior art, the mouse gives full satisfaction as a control peripheral of a computer when using the hand.

However, it may appear necessary to be able to control a computer or electronic system without resorting to using the hands, especially when the user is unable to do so (e.g., the user is disabled, operating machinery or a vehicle etc.)

SUMMARY OF THE INVENTION

The invention concerns the technical field of controlling an electronic or computer system.

In an exemplary but not exclusive application, the invention concerns controlling the movement of a pointer or cursor on the screen of the computer.

One embodiment of the present invention proposes controlling a computer or electronic system via a fluid flow (e.g., the breath of a user) with the aid of a control device.

In brief, the device in one exemplary implementation includes three sensors located in three channels in the device. The sensors sense a fluid current from a user blowing onto the sensors and intensity values from the sensors are input into a processor. It is desirable to have a method of receiving the input values from these sensors and using these to control an action of the electronic or computer system.

According to one aspect of the present invention, there is provided a method of controlling an electronic or computer system, the method includes receiving a plurality of input values from a plurality of fluid current sensors and using the value of the input signals and the gradient between different input signals to control an action of the electronic or computer system.

The plurality of input values may be stored in a data buffer.

The value of the input signals may be compared with a predefined threshold value to determine the control of the electronic or computer system.

In one embodiment, the gradient is used to determined whether or not to switch between a Boolean input mode and a functional input mode, wherein the Boolean input mode includes one or more of the following computerized functions: single click; double click; right click and held click.

The functional input mode may include one or more of the following computerized functions: controlling the movement of a pointer or cursor on the screen of a computer; implementing a scroll function on the screen of the computer and implementing a zoom function on the screen of the computer.

In one exemplary aspect, the input values are received from three fluid current sensors and are resolved into X and Y axes using the following equations:

$$X=0.866(C-B)$$

$$Y=A-0.5(B+C)$$

In order to allow a user to implement control or command functions (e.g., a single click, double click, right click and held click) the user is able to input this by transferring fluid current from one of the fluid current sensors to another, for example.

The present invention extends, according to an aspect thereof, to a method of controlling an electronic or computer system, the method including:
  sampling a plurality of fluid current sensors at predetermined intervals to obtain a plurality of input values from the fluid current sensors;
  storing data representing the plurality of input values;
  transmitting the data to a processor; and
  using the value of the input signals and the gradient between different input signals to control an action of the electronic or computer system.

Various other characteristics appear in the following description with reference to the accompanying drawings, which show by way of non-restrictive example the embodiments of the invention.

BRIEF DESCRIPTION OF THE DRAWINGS

The present invention is illustrated by way of example and not limitation in the figures of the accompanying drawings, in which like references indicate similar elements and in which:

FIG. 1 is a schematic view of the relative position of three sensors according to one exemplary embodiment;

FIG. 2 is a flowchart illustrating an exemplary embodiment of the operation of the method of the present invention; and FIG. 3 is a diagrammatical representation of a machine for use with the present invention.

FIG. 4 is a diagram showing the logical relationship of portions of the flowchart shown in FIGS. 4A-4E.

DETAILED DESCRIPTION

Figure 4A:
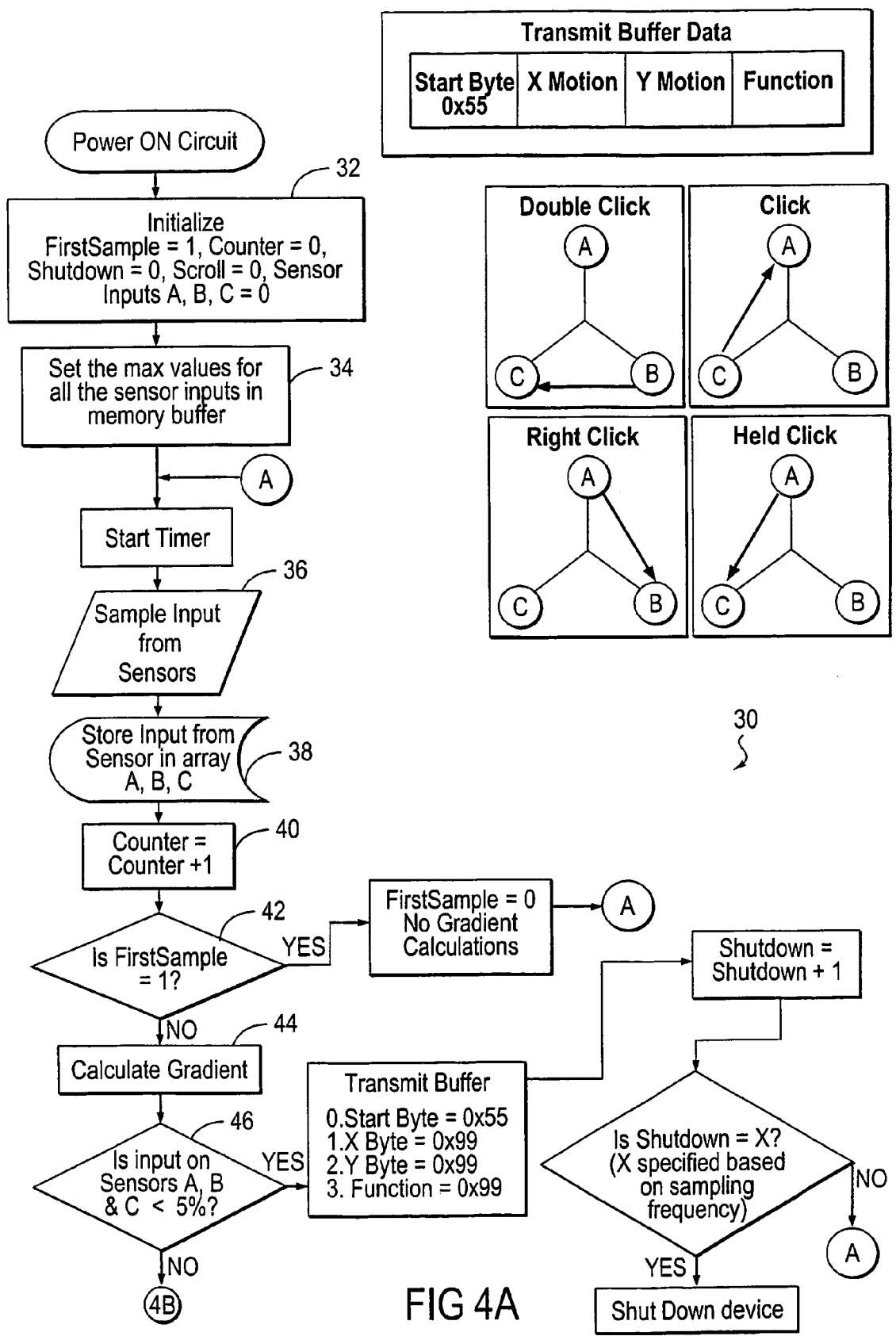
FIGS. 4A-4E show a flowchart illustrating a method 30 to control an electronic or computer system utilizing a fluid flow, according to an exemplary embodiment of the present invention.
Figure 4B:
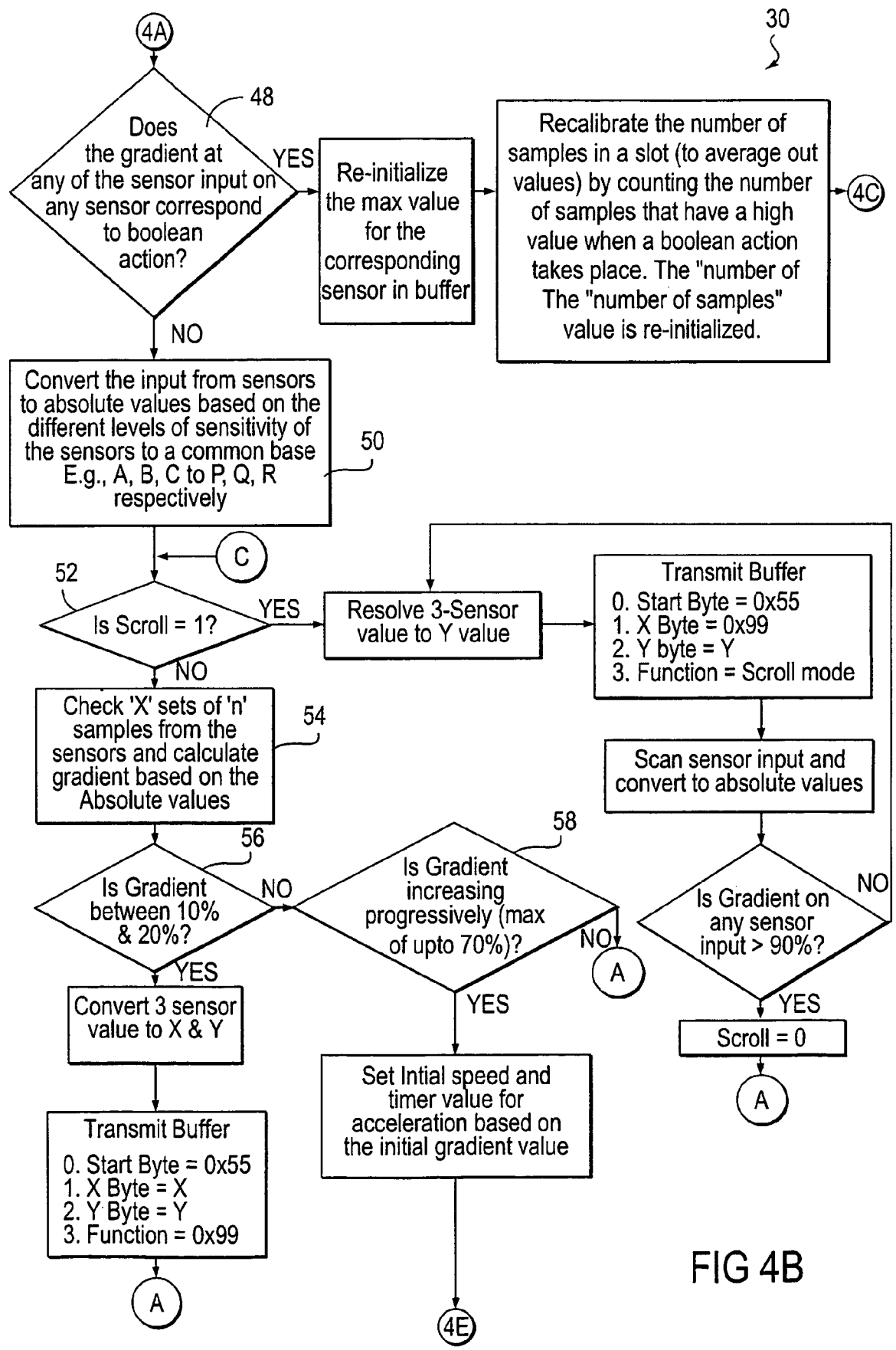
Figure 4C:
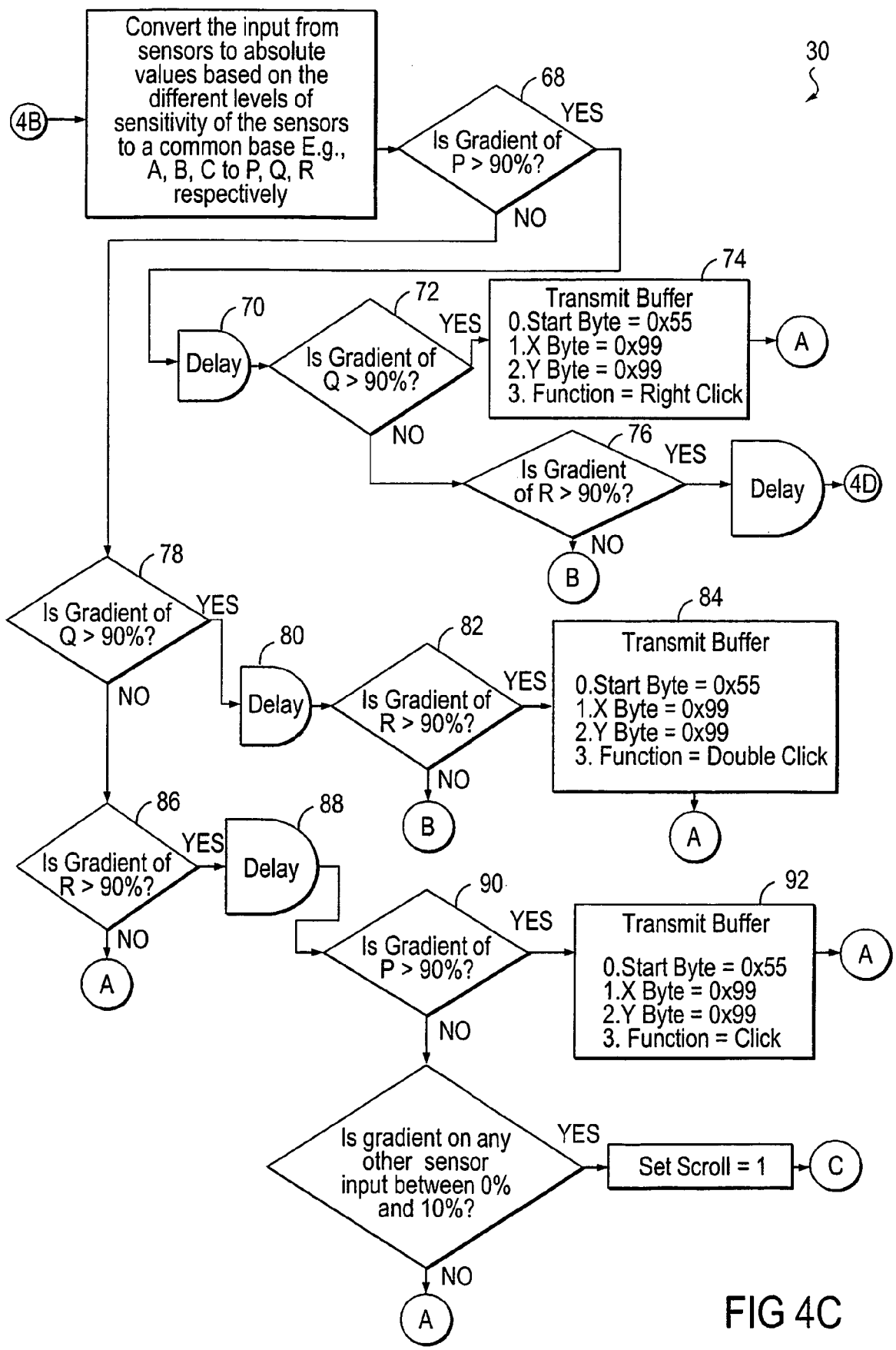
Figure 4D:
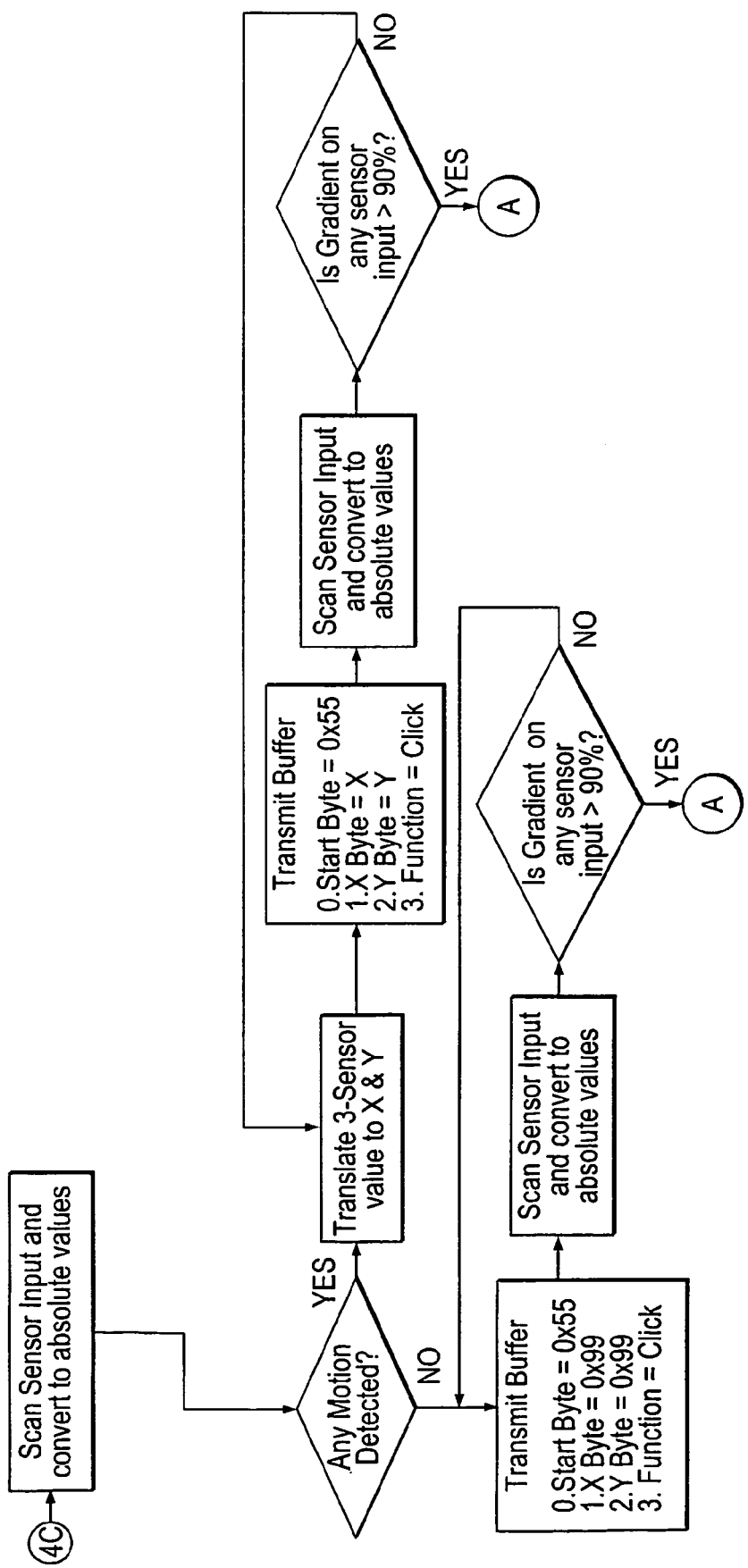
Figure 4E:
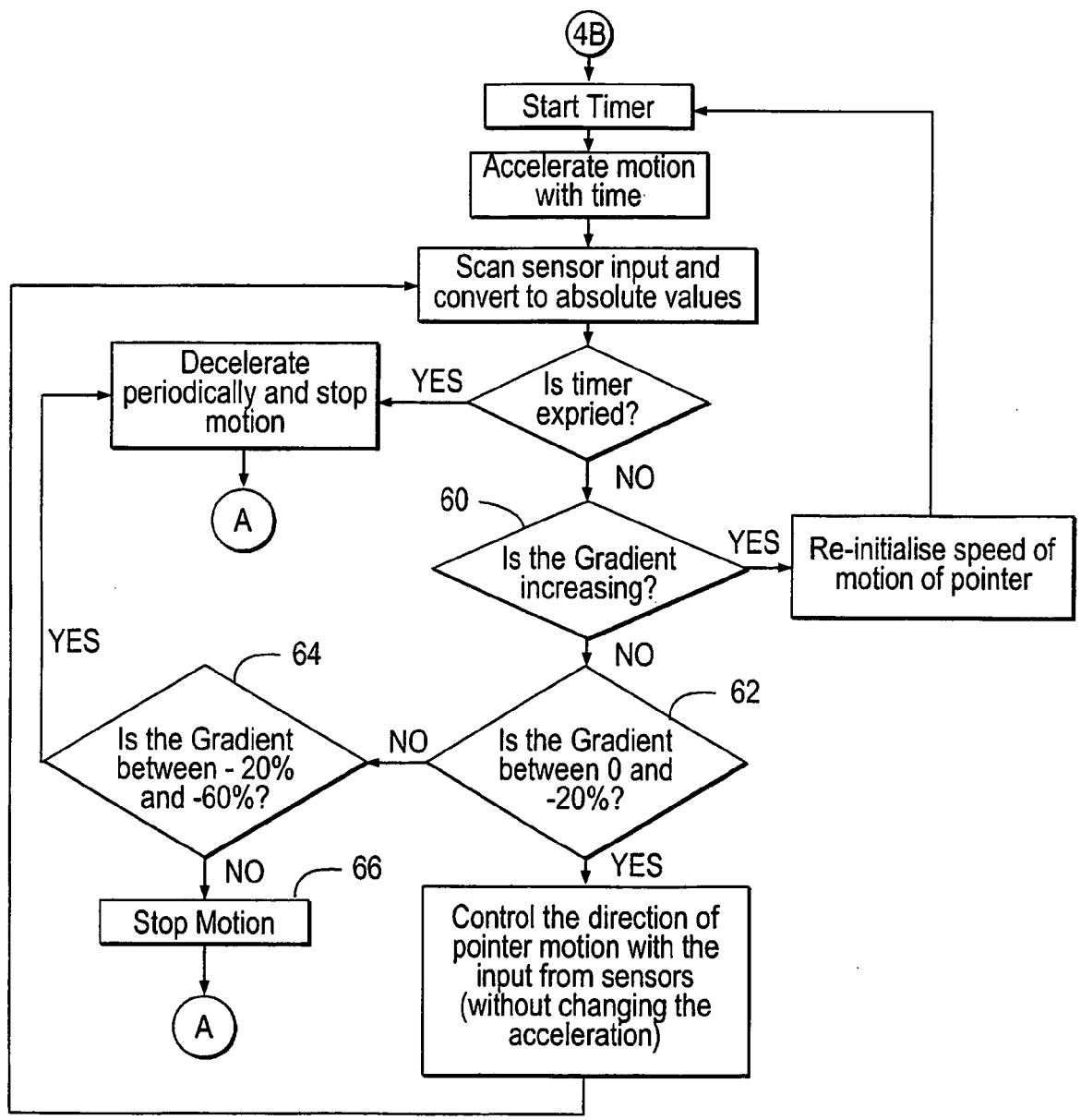

A method and an apparatus to control an electronic or computer system are described. In the following description, for purposes of explanation, numerous specific details are set forth in order to provide a thorough understanding of the present invention. It will be evident, however, to one skilled in the art that the present invention may be practiced without these specific details.

FIG. 1 is a perspective of view of a control device 10 that includes a housing 1, in which are defined in three fluid channels 2, 3 and 4. Each fluid channel, an exemplary embodiment, includes first and second openings, which operate respectively as inlets and outlets so as to allow the movement of fluid through the respective channel.

FIG. 2 is a plan view of the housing 1, and diagrammatically illustrates the inclusion of fluid sensors 5, 6 and 7 within the respective fluid channels 2, 3 and 4. Each of the fluid sensors is sensitive to movement of a fluid through a fluid channel in which the fluid sensor located. The control device 10 may also include a processor (not shown) that is coupled to receive signals from each of the sensors 5, 6 and 7, and to derive input values from these signals, the input values for example corresponding to the strength of the respective signals received from the sensors 5, 6 and 7. In an alternative embodiment, which is discussed in further detail below with reference to FIG. 3, the processor that is coupled to receive the signals from the sensors 5, 6 and 7 forms part of an interface box 18, which is in turn coupled to the control device 10.

FIG. 3 illustrates how the control device 10, according to an exemplary embodiment of the present convention, may be used in connection with a computer system 12 to provide input to and control the computer system 12. A connector 14 connects the control device 10 to an interface device 18. Into various embodiments, the connector 14 may provide a wired to or wireless connection between the interface device 18 and the control device 10. For example, the connector 14 may provide a wireless connection for more of a Bluetooth, radio frequency, or infrared connection.

The interface box 18 contains a processor to process signals arriving from a converter 22 that is coupled to the control device 10. While the converter 22 is shown to reside outside the control device 10 in FIG. 3, in alternative embodiments the converter 22 may be integral with the control device 10. The interface box 18 is communicatively coupled to computer system 12 via a connector 16, which may provide a wired or wireless connection.

Returning now to the three sensors 2, 3 and 4 that are located within the housing 1, these sensors are used to provide pointing and other functions such as clicking, which will be described in more detail below.

The sensors may be positioned within the housing 1 with an angle of 120° between each other as shown in FIG. 1.

The fundamentals of the present implementation, as to pointing, are to resolve the input from the three sensors into two axes (X and Y).

Applying the following equations does this:

$$X = 0.866(C-B)$$

$$Y = A - 0.5(B+C)$$

Although the exemplary embodiment will be described with reference to three sensors, it is possible implement the present invention in a four sensor architecture where similar functionality could be implemented such as adding the outputs from two sensors (e.g., positioned on a horizontal line) so as to get the X direction (positive, negative), and that of two other sensors (e.g., positioned on a vertical line) to get the Y direction.

Another method consists of considering and processing the highest values only, thereby to save power, rather than adding all outputs and processing results as in the exemplary design.

Other architectures likely to modify the processing principle as described in this document include but are not limited to:

- A system of two segments, each segment able to displace in two directions, e.g. down and up, depending upon whether the user blows on the segment itself or at an inlet that is connected to the segment thus displacing it the opposite direction (e.g., up),
- Multiple segments with distinct sensing properties (e.g., GMR sensor and segments with different shielding or magnetic properties),
- Sensors and segments positioned on several layers so as to get advanced features such as 3D pointing (e.g., segments on a second layer would be hit by breath once selected segments on a first, "top" layer would deflected by a certain amount).
- Disambiguate between external disturbances such as speech or wind and wanted stress breath to be turned into an interaction with computers and other devices.
- Make sure of differentiating between different functionalities so to make the interaction reliable and easy, given the allowed ranges of sensitivity, by means of intensity thresholds, gradients, (e.g., changes between successive intensity values), delays (e.g., timing of sequences of stress breath).
- Possibly adapt to power management requirements, e.g. by cycling optical sensors, and in such a case by having recourse to detecting the highest values on each pointing axis and then proceed to merge these values so to get the expected Human-Computer Interaction,
- Translate into required wireline or wireless protocols to sense a proper communication with computers and computerized environments.

FIG. 4 is a flowchart illustrating a method 30, according to an exemplary embodiment of the present invention, to control an electronic or computer system utilizing a fluid flow. The method 30 is described with reference to the exemplary control device 10, discussed above with reference to FIGS. 1-3. It will however be appreciated that the broader principles that are evident from the described exemplary method 30 may find application with control devices having other structures and arrangements.

Referring to the flowchart illustrated in FIG. 4, prior to processing the values outputted by the sensors 2, 3, and 4, these values need to be scaled/averaged so as to avoid having the processing influenced by differences in sensitivity that could result from the sensors and integrated circuit or discreet components. This could be caused by environmental conditions (e.g., temperature), user behavior, power deficiencies, successive user, fatigue, etc. Therefore, the peak output values for each sensor are stored in a memory buffer and are re-initialized each time a Boolean action is executed. The memory may be a flash memory, which is updated on a regular basis. The values serve as a re-calibration trigger for updating these maximum values. After the re-calibration, the absolute values are calculated for the sensor inputs.

Similar calibration can be implemented as to time, e.g. minima—click—and maxima—long motion—would serve to calibrate the device to the user, for instance by defining the number of samples to be considered per array to be processed. For example, to make the technology adaptable, the following may be taken into account.

- Maximum output from each sensor (given that for example with magnetic sensors, pollution from ambient magnetic fields might interfere, thus modifying that value, and hence the available range of sensitivity, or that batteries power decreases with time as well).
- In line with this notion, even minimum output from sensors is regularly calibrated, given that, e.g., in line with the instance above a monitor can create a strong enough magnetic field so to modify the minimum value outputted by a sensor.
- Shortest stress breath from the user (e.g., to get a click, this feature providing for a constant adaptation to user)
- Average "longer" stress breath for a period of use (e.g., the "longest" variable action achieved within the last, say, ten minutes), this allowing the "acceleration versus time" curve to be frequently re-scaled, hence matching the user's current behavior, given conditions, applications used, etc.
- Timing these stress breath durations and comparing them with available range of intensity will help determine, in real-time conditions, the number of samples required per array to be processed, in that, as an instance, harsh environments with strong external pollutions of any kind (e.g., magnetic fields, that can be shielded through, but as another instance a soldier with wearable computer on the battlefield, out of breath . . . ) will generate more "fickle" behaviors of the system, thus calling for more samples to constitute a single array to be processed, whereas usual usage patterns will need less samples at a time.

In addition to pointing being the motion of a pointer or cursor, various functions have to be implemented so to allow a true interaction with any computer or computerized devices, for example via menu-driven applications.

Below is a list of some of these functions, with instances of implementation. This list is not exhaustive. These are referred to hereinafter as Boolean functionalities. Furthermore, a number of other functionalities can be implemented, for example, motion from sensors 3 to 2, within present intensity and/or time thresholds, different time thresholds etc. Similarly, the values and thresholds hereafter are given to illustrate how the program works, and they can be modified according to parameters such as sensors' sensitivity, segments mechanical properties, etc. customization by user is possible too.

In the following examples of implementation, in which gradient, (e.g., change between sensors output values) is the basic parameter analyzed to make a decision on whether the user is pointing or "clicking" (i.e., a "switch-type" action), in the present case with a "slope" greater than 90%:

i. Click: a rapid motion from sensor B to A implements clicking, by stressing the relevant segments over sensors to get an output of about 90% of the maximum possible value.

ii. Double Click: a rapid motion from sensor C to B results in a double click, when segments are stressed so that sensors output is over 90% of the maximum value.

iii. Right Click: a rapid motion from sensor A to C results in a right ("contextual") click, when segments are stressed so that sensors output is over 90% of the maximum value.

iv. Held Click: a rapid motion from sensor A to B results in a held click, when segments are stressed so that sensors output is over 90% of the maximum value.

v. Function Mode: slightly different than the four functionalities above, in that this exemplary implementation is not based on turning the airflow from one sensor toward another one, such a Function Mode can be used to implement scroll (possibly in 2D), zoom or any other advanced functionality (such as 3D). When any of the sensors is stressed over 70% of max value for certain duration, to be predefined—preset time period—and possibly customized by users, the device turns into Function Mode.

Referring to the flowchart shown in FIG. 4, the exemplary method is shown to include the various operations discussed below:

Block 32: As mentioned previously, a processor (e.g., the processor 20 or a processor included within the control device 10) having a set of instructions thereon (e.g., embedded code) to implement the present invention is initially powered up and the registers are all zeroed. This in turn requires the registers to be set up and turned on, by appropriate routine, run once, on power up of the device. All the variables are initialized here. The different variables used are:

FirstSample—for checking whether the values are obtained from the sensor for the first time, Shutdown—to perform shutdown function, when all the sensors are not stressed (e.g., not above a certain level to be defined according to context of use, etc.) for a fixed duration of time. This mainly aims at saving power, Scroll—to implement the Y-axis motion for the scroll function once Function Mode is recognized (since this exemplary design does not provide for 2D scrolling, that is still marginal in existing GUIs at that time).

Counters and the sensor input arrays are initialized to zero before starting to store values.

Block 34: Maximum output values from the sensors are set in a memory buffer (see above).

Block 36: Outputs from the sensors A, B and C are scanned at regular intervals based on a timer value. All the sensor outputs are scanned and stored, without any cycling action. Cycling of sensors is not sought in this implementation because the values from all the three sensors are required to calculate the X and Y direction motions.

Blocks 40, 42 and 44: Gradient is used as the parameter for deciding an action. Gradient is, in the exemplary embodiment, defined as the difference in intensity between two successive values of a sensor output for a time period.

If the sample obtained is the first sample, then it is not possible to calculate the gradient. Hence, an action is taken only after obtaining a second sample. This is done using the FirstSample variable.

Block 46: If the sensors output values of less than 5% of the maximum value, then no valid input is taken into account. If this continues for a certain predefined time period, then it is implied that the device is not in use and the shutdown operation is performed.

Block 48: Based on an output obtained from the sensors at any given time, a decision is made by the software, executing a processor, on whether the action to be taken is Boolean, such as clicking or variable such as pointing.

Block 50: If a pointing, or any variable action, is to be taken, then the input from the sensors is converted to absolute values. As an exemplary embodiment, the inputs from sensors A, B, C are converted to P, Q and R respectively. These values are used to calculate the gradient values and to make further decisions on the type of action to be taken.

Block 52: If the device is in Function mode, then the corresponding action to be executed is that of Scroll. This is determined by the "Scroll" variable. If this variable is set (i.e., Scroll=1), then the motion is restricted to Y-axis. Hence the three-sensor output is resolved into just Y-axis. The motion is assigned a suitable acceleration co-efficient to enable easy scrolling. The device stays in function mode until a sudden increase in the sensor output value results in a gradient of 90% at the sensor output.

Block 54: Pointing is divided into two regions: slow and linear or variable pointing. To decide the type of motion for the pointer, sets of samples are observed and the gradient is calculated for each set of samples.

Block 56: If the gradient is between 10% and 20%, then pointing is restricted to slow motion. The X and Y values are directly calculated using the formula above and values are stored in the transmit buffer.

Block 58: When the gradient is between 20% and 70%, an initial value for acceleration is set, so as to assist the interaction by reducing the amount of air to be used, the duration of related expiration (e.g., breathing time and intensity) and smoothing pointing curves. This is decided based on the output gradient value at the sensor. The motion of the pointer is based on a preset "Acceleration versus Time" curve. The rate at which the pointer moves increases linearly until a timeout occurs and then it linearly reduces until the pointer stops. The timeout value is also set based on the initial output gradient. Timeout values can be calibrated as mentioned above, based on natural, average respiration parameters of users. As mentioned above, some pointing actions, such as the shortest (e.g., click) and longest ones time wise in the form of substantial pointing motions will possibly be stored so to take into account the natural durations of one user's "natural" breathing (possibly related to age, health, context, etc.) and set such values as references (e.g., for number of gradient samples/arrays).

Block 60: If the gradient of output increases in the time interval when the pointer is increasing its rate of motion—or increases it by "x", to be possibly defined, the value of acceleration and the timeout are re-initialized (based on the current gradient).

Block 62: If the user sustains the current intensity of stress on the sensors or even if this reduces in a tolerable manner (e.g., a gradient of between 0 and −20%), then the control for pointing action shifts from speed to direction only control. All the inputs from the sensors are used to maintain or change the direction of motion of the pointer.

Block 64: If the output gradient reduces drastically (e.g., a gradient of between −20% and −60%), a deceleration is imparted to the pointer motion. This periodically reduces to no motion.

Block 66: If the user ceases to stress the sensor segments, the motion is stopped completely. The maximum values for each sensor stored in the memory buffer are re-initialized each time a Boolean action is executed. This serves as a re-calibration trigger for updating these maximum values. After the re-calibration, the absolute values are calculated for the sensor inputs.

The "number of samples" value is reinitialized and set to a value based on the user capabilities. This increases the reliability of the decision made on the Boolean action.

Blocks 68-76: The second parameter for a successful clicking action is time. The increase in gradient should take place within a set duration of time. The sensor outputs are tested in sequences. Here, Sensor A is tested for high, followed by a delay before sensing the outputs from sensors B and C.

Blocks 78-84: If sensor B has a high gradient value (>90%), then a Right Click action is executed. If not, then sensor C is scanned for high.

Blocks 86-92: If sensor C has a high output value resulting in a high gradient value following sensor A, then a Held Click is executed. Two actions can be executed with Held Click, namely Drag & Drop and Held Click. If no motion is detected following the high on sensor C, then the regular Held Click is executed.

If any motion is detected after a high on sensor C, then a Drag & Drop is executed. The Held Click action is terminated by detecting a high in any of the sensor outputs.

If sensor B and C are stressed (in that order), then a Double Click is executed.

If sensor C is stressed high followed by sensor A, then a Click action is executed.

If any one of the sensors is stressed high for a certain preset period of time, then the system goes into function mode.

In addition to the flowchart and comments as detailed above, there are exemplary embodiments of the different processing principles mentioned above.

Power management can, in an exemplary design, be based on timers that control the time period between sampling each group of sensors, prior to storing the data in channels array. The processor can then enter a low power mode until a dedicated timer times out, thus repeating the sampling process until each channel data array is filled (set at a number of cells per channel). Once the channel data array is full, the dedicated timer is turned off since it is no longer needed. The filled array is then scanned and adjacent values are compared to each other. The data values are compared with respect to absolute value, change in value ("gradient"), time period between outputs, thresholds, so as to provide an accurate and reliable pointing (e.g., motion is prevented (nulled) during a click command).

Once the data array is filled, a data packet is sent to a transmitting module for transmission. Once the packet of data is transmitted, a dedicated timer is started and the whole process repeats.

Whenever the transmitter broadcasts a data packet, a processor will interrupt what it was currently doing and process the received data, looking first for the start byte, as a unique value not used in the actual data set. If the first byte of data does not equal to the start byte (e.g., as a result of RF noise) then the receiver continues to listen for a valid start byte.

Motion input can then be done, for example in a USB-USB mouse protocol compatible chip and by generating quadriture signals for both the X and Y axis, changes in the pulse width of these signal controlling the speed of motion.

Figure 5:
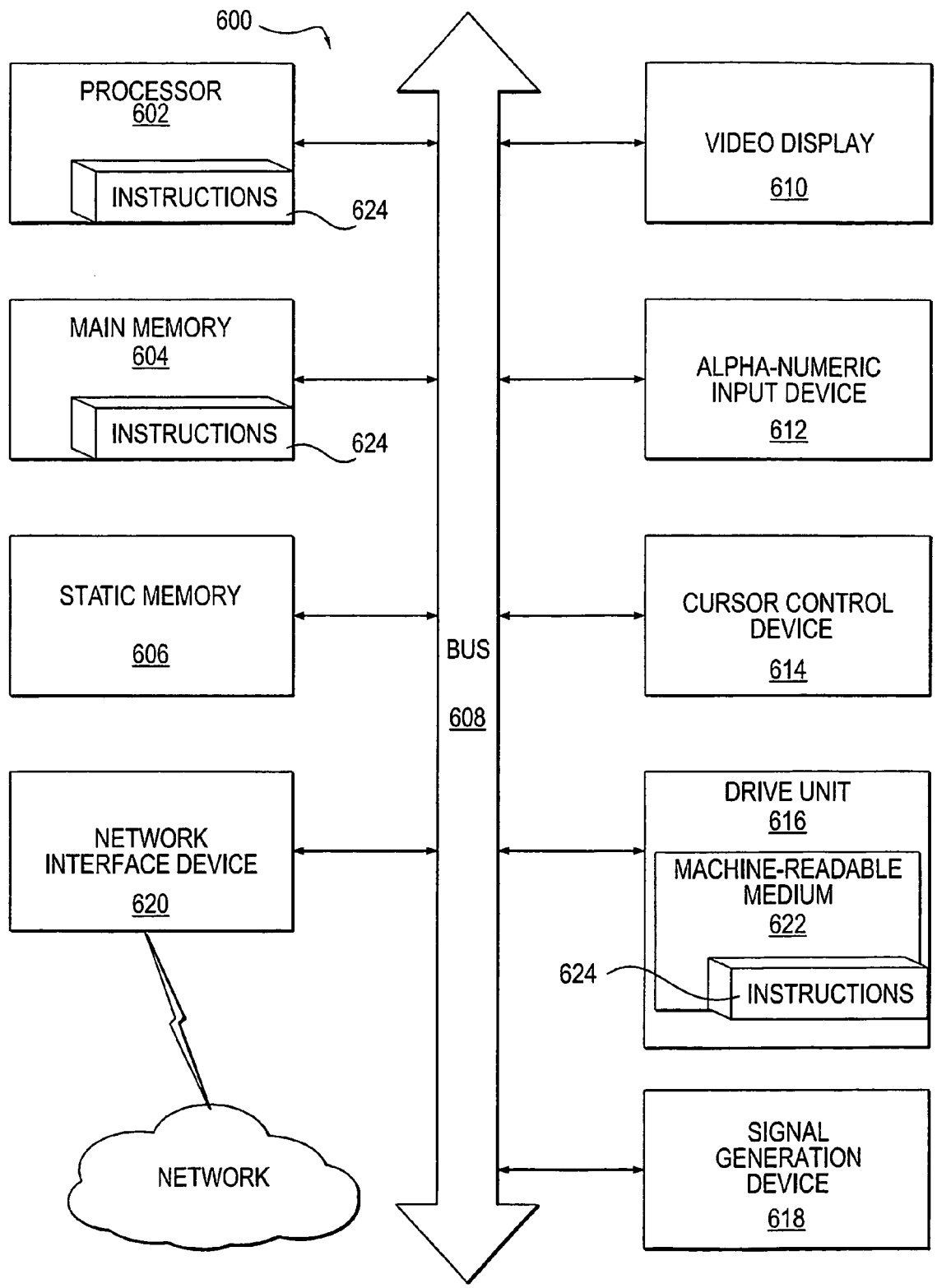
FIG. 5 shows a diagrammatic representation of a machine in the exemplary form of a computer system 600 within which a set of instructions, for causing the machine to perform any one or more of the methodologies discussed herein, may be executed.

FIG. 5 shows a diagrammatic representation of machine in the exemplary form of a computer system 600 within which a set of instructions, for causing the machine to perform any one or more of the methodologies discussed herein, may be executed. The machine may, however, simply be the control device 10, including or coupled to a processor and a memory device. However, in certain embodiments of the present invention, processing (e.g., the various operations of the method 30 discussed above) may be performed on the computer system 600, to which the control device tendon is coupled.

In various embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be the control device 10 itself, wearable computer, telematics on and off-board equipment, home networking appliances, military and security system, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., the control device 101), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 692 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

From an ergonomic and usability standpoint, as is implemented in the exemplary embodiment, the user may interact with a computer system 12 with no need to sustain the airflow for the whole duration of the inputting, nor to necessarily calling for an increase in pressure so to accelerate the motion of the pointer. The maximum duration of a single, continuous flow is calibrated, on a regular basis—e.g.

a counter triggers a sampling every "x" stresses—, based on the user's average, easy, natural expiration's duration within considered pressure levels, thus making the device suitable, for instance, to a variety of users such as children, elderly as well as people who have a cold, whereas max intensities are frequently calibrated based on peaks of outputs—i.e. Boolean interactions, see example —, so that the total range of intensity remains consistently available—e.g. 0 to 99—, thus allowing the processing, for example based on gradients to remain stable with time.

In line with these considerations, an "acceleration versus time" curve may be implemented, so to accelerate the motion of the pointer after a sufficient number of calibrated output values has been sampled, and then decelerate the motion. These acceleration/deceleration phases can of course, in addition to their processing-dependent part, be changed by the user in real-time, as embodied in the attached exemplary flowchart.

To some extent, such a processing allows to "simulate" the natural, usual motion a person could get from blowing at something (e.g. a feather), with inherent inertia, with the ability to control the resulting motion, though, e.g. to stop it so to allow an easy targeting.

Thus, a method and apparatus to control an electronic or computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of controlling a computer system, the method comprising:
    performing at regular intervals in time, actions comprising:
        receiving a set of sensor samples, each set comprising a plurality of input values from a corresponding plurality of fluid current sensors of a user input device;
        calculating a respective gradient value for each fluid current sensor of the plurality of fluid current sensors, using two or more most recent in time sets of sensor samples;
        determining that a particular condition exists when a certain number of the plurality of input values are above a first threshold, the particular condition representative of receipt of valid user input;
        if the particular condition exists, the calculated gradient value of one or more of the plurality of input values corresponds to a Boolean user action, and one or more of the plurality of input values are above a second threshold, transmitting to the computer system a control signal that is representative of the Boolean user action;
        if the particular condition exists, none of the calculated gradient values of the plurality of input values corresponds to a Boolean user action, and none of the plurality of input values is above the second threshold, transmitting to the computer system a control signal that is representative of a variable user action; and
        if the particular condition does not exist, considering the input values as invalid input values and performing a shutdown operation.

2. The method according to claim 1, wherein a peak value of each of one or more of the plurality of input values is stored in a data buffer.

3. The method of claim 1, further comprising:
    scaling the plurality of input values in view of the respective gradient values.

4. The method of claim 3, wherein calculating the gradient value comprises comparing the plurality of input values to other received input values for a prior time period.

5. The method of claim 3, wherein calculating the gradient value comprises comparing the plurality of input values to predefined threshold values.

6. The method of claim 1, wherein the Boolean user action represents one of a single-click input, a double-click input; a right-click input, or a held click input.

7. The method of claim 1, wherein the variable user action represents movement in two or more dimensions.

8. The method of claim 1, wherein the first threshold is 5% of the respective peak input value.

9. The method of claim 1, wherein the second threshold is 90% of the respective peak input value.

10. A system for controlling a computer system, the system comprising:
    a plurality of fluid current sensors for producing a corresponding plurality of input values; and
    one or more processing circuits operable to, at regular intervals in time:
        receive a set of sensor samples, each set comprising the plurality of input values from the corresponding plurality of fluid current sensors;
        calculate a respective gradient value for each fluid current sensor of the plurality of fluid current sensors, using two or more most recent in time sets of sensor samples;
        determine that a particular condition exists when a certain number of the plurality of input values are above a first threshold, the particular condition representative of receipt of valid user input;
        if the particular condition exists, the calculated gradient value of one or more of the plurality of input values corresponds to a Boolean user action, and one or more of the plurality of input values are above a second threshold, transmit to the computer system a control signal that is representative of the Boolean user action;
        if the particular condition exists, none of the calculated gradient values of the plurality of input values corresponds to a Boolean user action, and none of the plurality of input values is above the second threshold, transmit to the computer system a control signal that is representative of a variable user action; and
        if the particular condition does not exist, considering the input values as invalid input values and performing a shutdown operation.

11. The system of claim 10, further comprising a data buffer for storing a peak value of each of one or more of the plurality of input values.

12. The system of claim 10, wherein the one or more processing circuits are further operable to:
    scale the plurality of input values in view of the respective gradient values.

13. The system of claim 10, wherein calculating the gradient value comprises comparing the plurality of input values to other received input values for a prior time period.

14. The system of claim 10, wherein calculating the gradient value comprises comparing the plurality of input values to predefined threshold values.

15. The system of claim 10, wherein the Boolean user action represents one of a single-click input, a double-click input; a right-click input, or a held click input.

16. The system of claim 10, wherein the variable user action represents movement in two or more dimensions.

17. The system of claim 10, wherein the first threshold is 5% of the respective peak input value.

18. The system of claim 10, wherein the second threshold is 90% of the respective peak input value.

* * * * *